United States Patent
Klaus et al.

(10) Patent No.: US 6,874,680 B1
(45) Date of Patent: Apr. 5, 2005

(54) REMOTE UPDATING METHOD AND APPARATUS

(75) Inventors: Robert Klaus, Owatonna, MN (US); Troy Liebl, Owatonna, MN (US); Manohar Chinnadurai, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 48 days.

(21) Appl. No.: 09/702,751

(22) Filed: Nov. 1, 2000

Related U.S. Application Data (60) Provisional application No. 60/240,803, filed on Oct. 17, 2000.

(51) Int. Cl.$^7$ .............................................. G06F 17/00
(52) U.S. Cl. ......................... 235/375; 235/376; 235/438
(58) Field of Search ................................ 235/375, 376, 235/438, 441, 462.01, 462.46, 472, 472.02

(56) References Cited

U.S. PATENT DOCUMENTS

| | | | |
|---|---|---|---|
| 4,739,323 A | 4/1988 | Miesterfeld et al. ..... 340/825.5 |
| 4,853,850 A * | 8/1989 | Krass et al. ................. 364/200 |
| 4,962,456 A | 10/1990 | Abe et al. ............... 364/431.01 |
| 4,975,846 A | 12/1990 | Abe et al. ............... 364/424.03 |
| 4,975,847 A | 12/1990 | Abe et al. ............... 364/424.03 |
| 5,003,477 A | 3/1991 | Abe et al. ............... 364/424.03 |
| 5,056,023 A | 10/1991 | Abe ....................... 364/424.03 |
| 5,132,905 A | 7/1992 | Takai et al. ............ 364/424.03 |
| 5,150,048 A | 9/1992 | McAuliffe et al. ...... 324/158 R |
| 5,319,962 A | 6/1994 | Kaminski et al. ............. 73/116 |
| 5,416,917 A | 5/1995 | Adair et al. ................. 395/500 |
| 5,442,553 A | 8/1995 | Parrillo ................... 364/424.04 |
| 5,459,660 A | 10/1995 | Berra ..................... 364/424.03 |
| 5,555,498 A | 9/1996 | Berra et al. ............ 364/424.03 |
| 5,737,711 A | 4/1998 | Abe et al. ...................... 701/29 |
| 5,815,071 A | 9/1998 | Doyle ........................ 340/439 |
| 5,848,064 A | 12/1998 | Cowan ....................... 370/338 |
| 5,850,209 A * | 12/1998 | Lemke et al. ................ 345/156 |
| 5,884,202 A | 3/1999 | Arjomand ..................... 701/29 |
| 5,922,037 A | 7/1999 | Potts ........................... 701/29 |
| 6,263,322 B1 * | 7/2001 | Kirkevold et al. .......... 705/400 |
| 6,324,592 B1 * | 11/2001 | Hindman ....................... 710/3 |
| 6,370,449 B1 * | 4/2002 | Razavi et al. .................. 701/1 |

* cited by examiner

*Primary Examiner*—Daniel StCyr
(74) *Attorney, Agent, or Firm*—Baker & Hostetler LLP

(57) ABSTRACT

A hand-held diagnostic tool designed to operate and easily upgrade software applications developed for automotive diagnostics, is disclosed. The diagnostic tool, which communicates with a plurality of motor vehicle control units, provides application upgrades and/or modifications and/or new algorithms that are developed/adapted via remote updating. Remote updating is accomplished through a number of external ports on the tool that facilitate modem, Ethernet and wireless communications, including point-to-point protocol connection to the Internet.

23 Claims, 7 Drawing Sheets

REMOTE UPDATING METHOD AND APPARATUS

This application claims the benefit of Provisional application Ser. No. 60/240,803, filed Oct. 17, 2000.

FIELD OF INVENTION

The present invention generally relates to the field of automotive diagnostics. More particularly, the present invention relates to a portable device designed to operate, and easily upgrade, software applications developed for automotive diagnostics.

BACKGROUND OF THE INVENTION

Historically, diagnostic evaluation of a vehicle control system was performed by using designated, generally stand-alone-type testing equipment that was coupled to the specific vehicle's control system. Vehicle control systems have become more computerized, electronic control units have been installed in motor vehicles. These control units include one or more micro-controllers used to control operation of a variety of vehicular control systems, such as the engine, transmission, brakes or the steering mechanism.

Today in the automotive industry, there are hand-held diagnostic testers or tools used in connection with motor vehicle maintenance and repair. For instance, hand-held diagnostic tools have been used to trouble-shoot faults associated with vehicular control units. Typically such tools have included a micro-processor and an interface circuit to facilitate communication between the vehicle's electronic control unit and the tool's micro-processor. Each diagnostic tool has also included non-volatile internal or external memory, such as a plug-in module, that stores various diagnostic routines to enable the tool to communicate with a vehicle's control unit as well as provide information to a user.

However, in conventional practice, these diagnostic routines have been problematic in the area of upgrades. Typically, when a single diagnostic routine was added or modified, the new diagnostic routine to be added or modified had to be compiled and linked with the other existing routines before the combined routine, in its entirety, could be downloaded into a tool's non-volatile memory. These program upgrades and additions have therefore been difficult to accomplish and have resulted in downtime for the equipment that are inconvenient for the user.

It is therefore desirable to provide a diagnostic tool that facilitates in part easy program upgrades.

SUMMARY OF THE INVENTION

The foregoing need for a diagnostic tool wherein the diagnostic software can be easily upgraded is satisfied to a great extent by the present invention which is directed to a portable diagnostic tool that provides easy program upgrades/modifications via remote updating when, for example, diagnostic application programs are upgraded or new algorithms are developed or adapted. The diagnostic tool functions with an internal operating system that accesses software programs in the form of diagnostic routines residing in the internal memory, or on an external memory card. Each diagnostic routine is compiled and linked separately from the operating system and is separately downloadable into a non-volatile storage device, such as the non-volatile memory, of the diagnostic tool.

More specifically, in one aspect of the present invention, program updates/modifications are accomplished via a compact flash card, which is configured to provide additional software programs and/or additional memory. In an exemplary embodiment, the compact flash card controls reads/writes to the internal and/or external flash memory, and interfaces with a compact flash card port on the diagnostic tool.

Alternatively and optionally, the compact flash card may be used with a smart card system for preventing the unauthorized downloading of software into a diagnostic tool. The smart card system preferably includes a smart card, which contains subscription information for the diagnostic tool, and a smart card reader device, which allows information stored within the smart card to be read and/or modified. The smart card serves as a controlled access security device. Preferably, the smart card reader device is part of the diagnostic tool.

Generally, for example, the smart card may only be used when a new software program is installed. An example of an installation operation may require the compact flash card to be inserted into the diagnostic tool along with a smart card. As soon as the diagnostic tool verifies the smart card, the software is downloaded from the compact flash card into the tool's internal memory. After program installation, both cards (the flash card and the smart card) may be removed for storage in a secure place.

In another aspect of the present invention, program upgrades/modifications are accomplished via bulletin board systems (BBS), which interface with a tool's modem to provide software upgrades and/or modifications. In a preferred embodiment, in using the bulletin board system, a point-to-point connection between the diagnostic tool and the BBS server is established using the tool's modem. Alternatively, connection may be established via a standard dial-up connection. Once a connection is established, the tool's software retrieves an index file containing a list of available diagnostic applications to download. This list is displayed to the user, who initiates a desired selection. Software internal to the diagnostic tool performs a verification process to determine if the tool has the ability to download the requested file.

In a preferred embodiment, one verification criteria is the existence of a valid smart card. Alternatively and optionally, another verification criteria is the existence of a valid application record stored on the internal hard drive of the tool. The internal record is a copy of the contents of a valid smart card. Upon successful verification, the tool automatically downloads a user's requested upgrade application, which is installed into the tool. If the verification process is unsuccessful, the tool notifies the user accordingly.

In another aspect of the present invention, program upgrades and/or modifications are accomplished via serial ports. In a preferred embodiment, upgrades and/or modifications can be provided to the diagnostic tool through a serial communication port to a personal computer. Preferably, the tool's serial port may comprise a Universal Serial Bus (USB) port, an IEEE I394, an IrDA compatible infrared, an Ethernet or a RS-232 port, that is configured to communicate with a personal computer. For example, the USB or RS-232 port may be operatively connected to peripheral devices, such as keyboards, printers and memory hard drives.

Alternatively and optionally, upgrades and/or modifications can also be provided through a standard Personal Computer Memory Card International Association (PCMCIA) port.

In another aspect of the present invention, program upgrades and/or modifications are accomplished by downloading the software from a server over the Internet via a communications protocol such as TCP/IP and PPP.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

Figure 1:
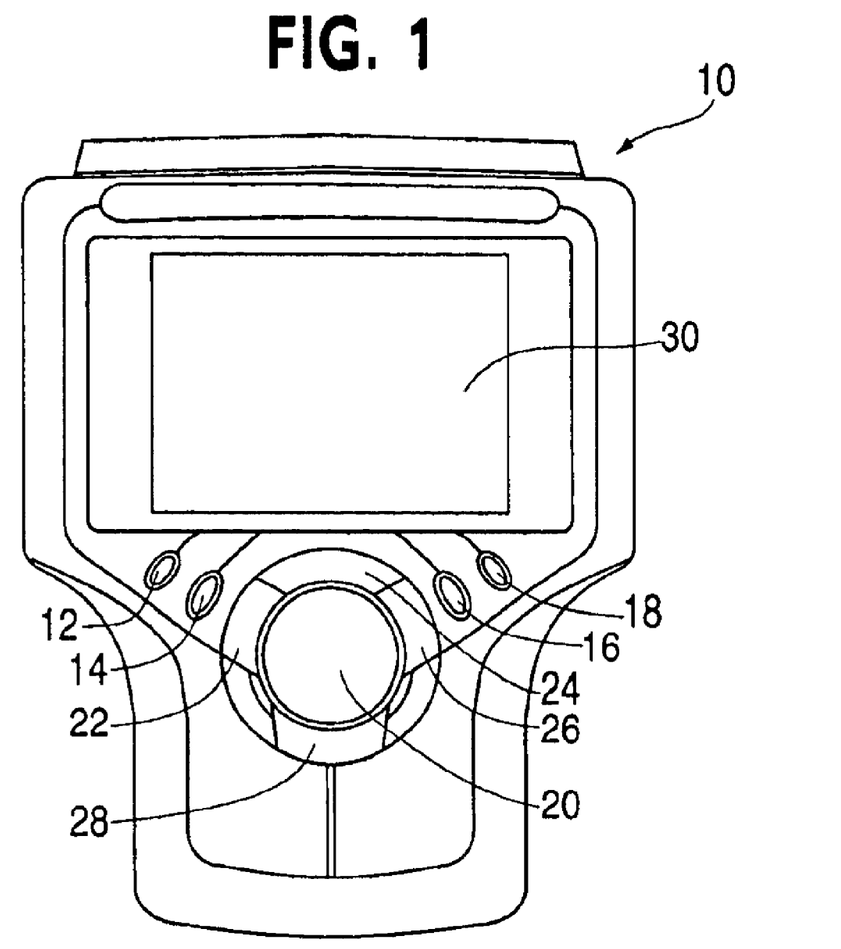
FIG. 1 is a front plan view of a diagnostic tool according to a preferred embodiment of the present invention.

Referring now to the figures wherein like reference numerals indicate like elements, in FIG. 1 there is shown a diagram of a diagnostic tool 10 according to an embodiment of the present invention. The command key operations of the diagnostic tool, shown on the tool's front panel, consist of four areas: function keys 12, 14, 16, and 18, a cursor or direction key 20, and action keys 22, 24, 26, and 28. These keys are used for entering instructions and/or data in the tool.

The function keys 12, 14, 16, and 18 activate unique commands. Each command function is displayed on the screen 30 of the diagnostic tool 10. The function keys 12, 14, 16, and 18 are controlled by the software program and will preferably change as different parts of a diagnostic routine or procedure are displayed. The directional key 20 moves a command bar in a left, up, right or down direction on the screen 30.

The action keys 22, 24, 26, and 28 activate an action or request an application. In a preferred embodiment, the action keys 22, 24, 26, and 28 comprise a HELP key 22, which is depressed to request information for an option on the viewed screen; an ENTER key 24, which activates or selects a desired action; a MENU key 26 to go to the application manager menu; and an EXIT key 28 to move back (i.e. exit or quit) one screen at a time.

The diagnostic tool 10 display 30 is capable of displaying character, numeric and graphic information. The tool also includes a system setup utility, which provides basic operating system settings, such as system function configuration, contrast and print setup. The tool functions with an internal operating system that accesses software programs in the form of diagnostic routines.

For example, according to one embodiment of the present invention, a diagnostics routine or program processes vehicle control system data into an easily readable format, and then makes that data accessible through the diagnostic tool 10. The routine/program will read, graph and record sensor and switch input or output, including data stream. The routine/program also reads diagnostic trouble codes and performs special tests.

In a preferred embodiment, the diagnostics routine or program tests all On-Board Diagnostics Two (OBD II) applications, such as General Motors, Saturn, Ford, Jeep and Chrysler. The diagnostics routine of the present invention is also capable of testing most Asian and European imports equipped with the OBD II emissions standard system. It initiates the diagnostic process by creating a custom menu that lists tests and procedures available for each vehicle description entered into the routine/program. Preferably, the diagnostic tool can store up to 25 vehicle descriptions in files that can be re-used to re-enter a vehicle description.

From the custom diagnostic menu a number of power test options can be selected. For example, a user or technician can select DATASTREAM to view sensor and switch data stream information communicated from the vehicle computer. Data stream is the electrical signal sent between the vehicle computer and the vehicle sensors or switches. The data is converted and displayed in a readable format for the repair technician. The DATASTREAM option of displaying data is shown in FIG. 2 wherein the data collected by sensors on an automobile can be arranged on-screen 32 side-by-side, viewed in a real-time graph 34, and also recorded and printed for examination or as a document.

Figure 2:
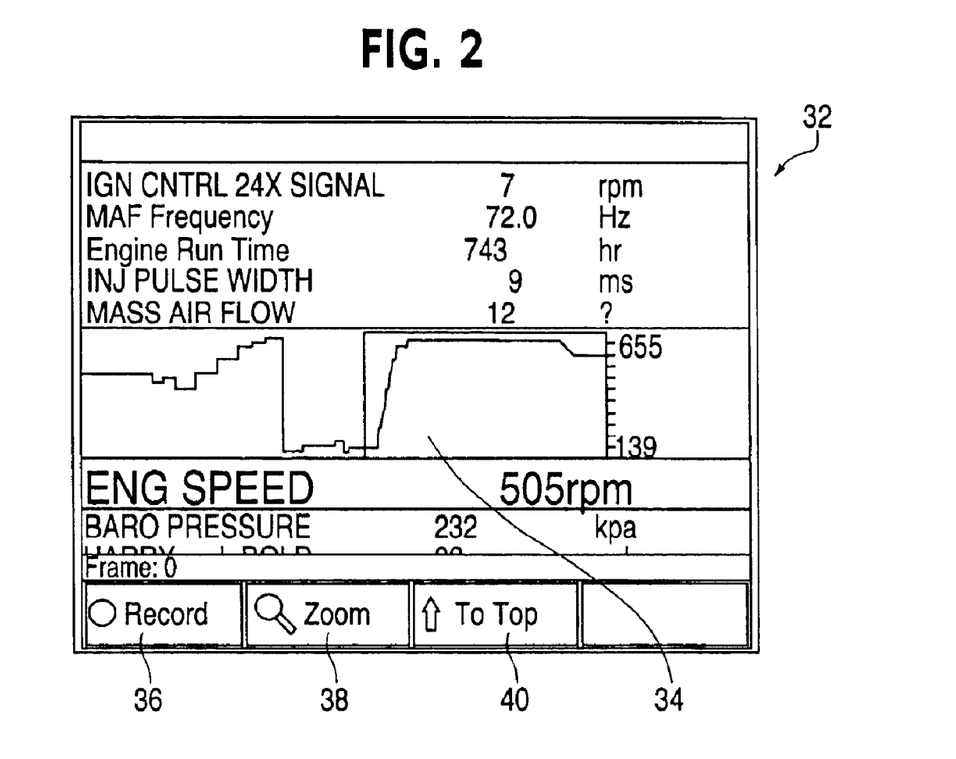
FIG. 2 is a screen shot of a real-time graph of the sensors in a side-by-side comparison arrangement.

In a preferred embodiment, as illustrated in FIG. 2, the data stream display format can arrange either a pre-selected group or all of the sensor and switch outputs detected from the vehicle. The arrangement may follow in alphabetical order.

In addition to the DATASTREAM option, the user or repair technician can press the function key 12 associated with the RECORD box 36 displayed on the screen 30 to quickly capture data that occurs before and after the function key is pressed; or view a file recorded when a diagnostic trouble code is detected. As shown in FIG. 2, other function keys would be associated with the ZOOM box 38 and the To Top box 40.

Also, the user can select DIAGNOSTIC CODES to view diagnostic trouble codes set by the vehicle computer. In a preferred embodiment, the diagnostic routine/program can view pending codes to see if a trouble code is about to be set. Preferably, it lists the General Motors OBD II trouble code designations of A, B, C and D to help lead the technician through problem diagnosis in order of importance.

Alternatively and preferably, the user can select SPECIAL TESTS to initiate many specific tests for vehicle sensors and, additionally, control General Motors bi-directional devices and view the immediate sensor reactions on-screen.

Figure 3:
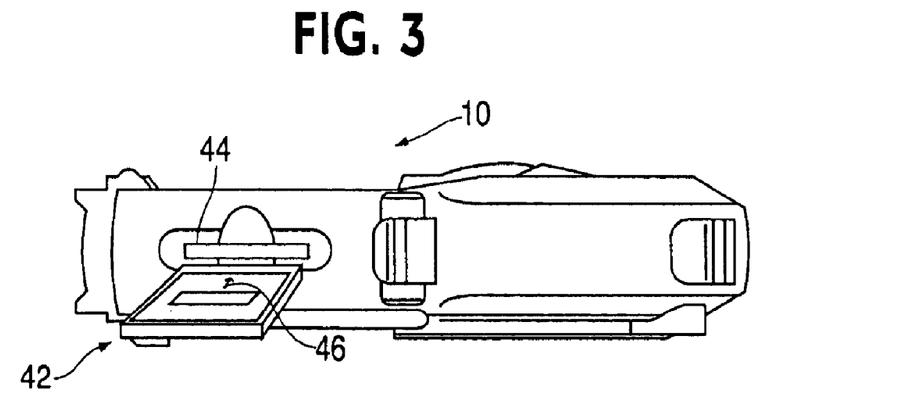
FIG. 3 is a left side plan view of the diagnostic tool of FIG. 1 with a perspective view of compact flash card.

One aspect of the present invention that provides easy program upgrades and/or modification via remote updating, employs a compact flash card 42, as shown in FIG. 3. The compact flash card 42 is preferably used to provide additional software programs for the diagnostic tool 10. Alternatively and optionally, the compact flash card may be used to provide additional memory for the diagnostic tool. In an exemplary embodiment, the compact flash card 42 controls reading and/or writing functions to the internal and/or external flash memory. It also interfaces with the compact flash card port or slot 44 located on the diagnostic tool 10.

In a preferred embodiment, the compact flash card 42 may be used in conjunction with a smart card system for preventing the unauthorized downloading of software in the diagnostic tool 10. A directional arrow 46 is aligned towards the flash card slot 44, and smoothly inserted until it clicks in place.

Figure 4:
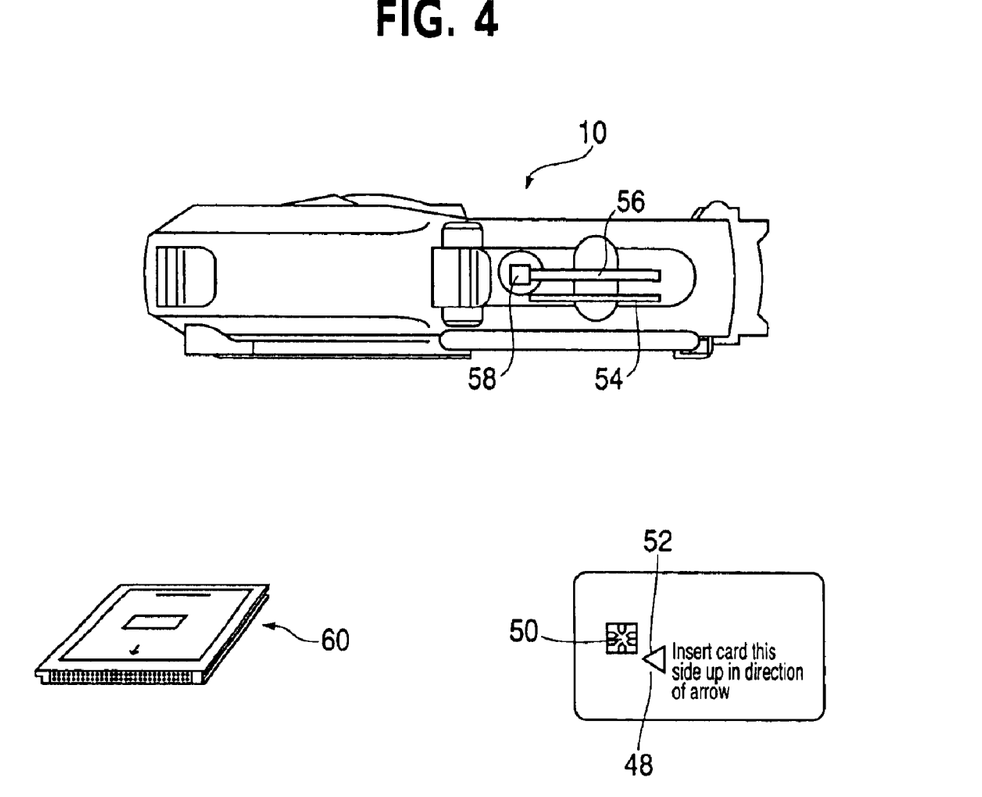
FIG. 4 is a plan view of the diagnostic tool of FIG. 1 with a perspective view of a smart card and a PC card.

Referring to FIG. 4, the smart card 48 contains subscription information for the diagnostic routines and tool, according to the present invention. This information is stored on a smart card memory chip 50. Following the directional arrow 52, the smart card is inserted into a smart card slot 54 in the diagnostic tool 10.

Thus, once the flash card 42, FIG. 3, is inserted into the diagnostic tool 10 along with a smart card 48, the tool verifies the smart card 48 and, upon successful verification, the software is downloaded into the tool's memory.

In another aspect of the present invention, diagnostic program upgrades and/or modifications can be accomplished using bulletin board systems (BBS) via point-to-point protocol (PPP) connection, dial-up connection or normal log-in to a dedicated server. The diagnostic tool 10 is equipped with a PC card port 56 and eject button 58. A PC card 60 supplies capabilities including modem, Ethernet and wireless communications, such as an intranet and Internet.

Figure 5:
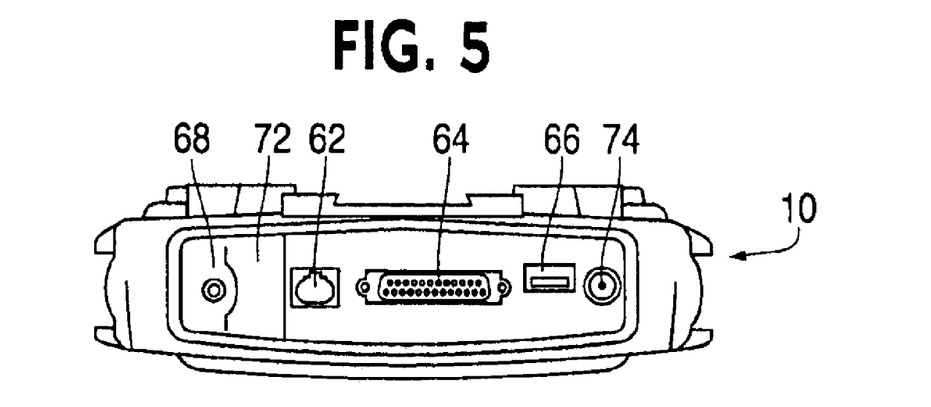
FIG. 5 is a plan view of the diagnostic tool of FIG. 1 showing various serial ports.

Remote updating is also accomplished via serial ports. In a preferred embodiment, program upgrades and/or modifications can be provided to the diagnostic tool through a variety of serial ports. For example, as shown in FIG. 5, the tool may be configured to include an RS-232 serial port 62, which is usable to communicate with a personal computer. The tool may also be configured to include a DB-25 pin port 64, which is used to connect a cable to a vehicle data link connector. While remote updating is not accomplished using port 64, it is important to note that communication with the computer installed in a vehicle requires an adapter cable connection (not shown) to the vehicle data link connector and to the diagnostic tool 10, and port 64 is a part of that communication link.

In addition, the diagnostic tool 10 may be configured to include a Universal Serial Bus (USB) port 66. This port 66 is capable of operative connection to peripheral devices, such as keyboards, printers and memory hard drives. Note the PC card slot/port 56, smart card slot/port 54 and compact flash card slot/port 44 as previously discussed. A power key 68 is also provided for turning power to the diagnostic tool 10 on and off.

Figure 6:
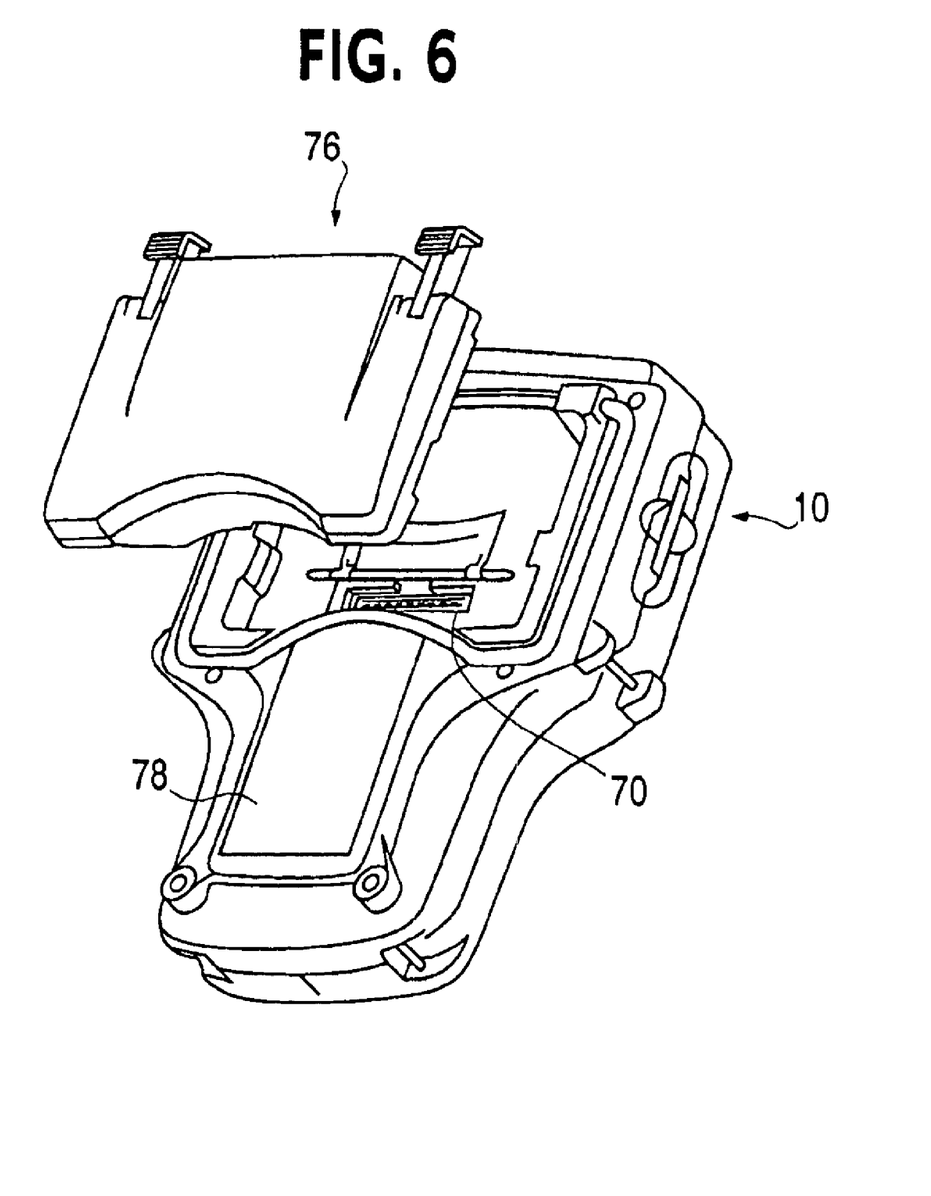
FIG. 6 is a perspective view of the diagnostic tool of FIG. 1 with a Hardware Interface Module Port (HIP) in accordance with a preferred embodiment of the invention.

As shown in FIG. 6, in a preferred embodiment of the present invention, the diagnostic tool is also configured to include a Hardware Interface Module Port (HIP) pin connector 70. The HIP connector accepts a HIP module 76. The HIP module 76 enables implementation of cartridge-contained software programs. These software programs may be resident on cartridges and can include diagnostics routines directed to the Pathfinder 1999, for example.

Alternatively and optionally, the diagnostic tool may also be configured to include an infrared communication window 72, FIG. 5. The window 72 has infrared capability and can be used to communicate with a parallel printer (not shown) for wireless printing. An external power port 74 accepts 12 volt input for recharging an battery 78, FIG. 6.

Also, the tool is configurable to operate with a number of plug-in modules (i.e. HIP module 76), one of which is a cartridge reading device that allows the user to use existing software cartridges, such as diagnostic routines directed to the Pathfinder vehicle models, import models and Anti-locking Brake Systems (ABS), for example. Additional plug-in modules are configurable to provide features such as emission, lab scope, ignition, re-flash and multi-meter capabilities.

It is now apparent that the present invention has number of features and advantages over the prior art. For instance, the diagnostic tool is capable of communicating via the Internet using the TCP/IP protocol. Using the cartridge and card options, software upgrades can be disposed of after downloading. Using the compact flash card 42 for the dual purpose of upgrading additional memory, the diagnostic tool's memory and program routines can be updated by replacing the card rather than changing the board of each tool.

Figure 7:
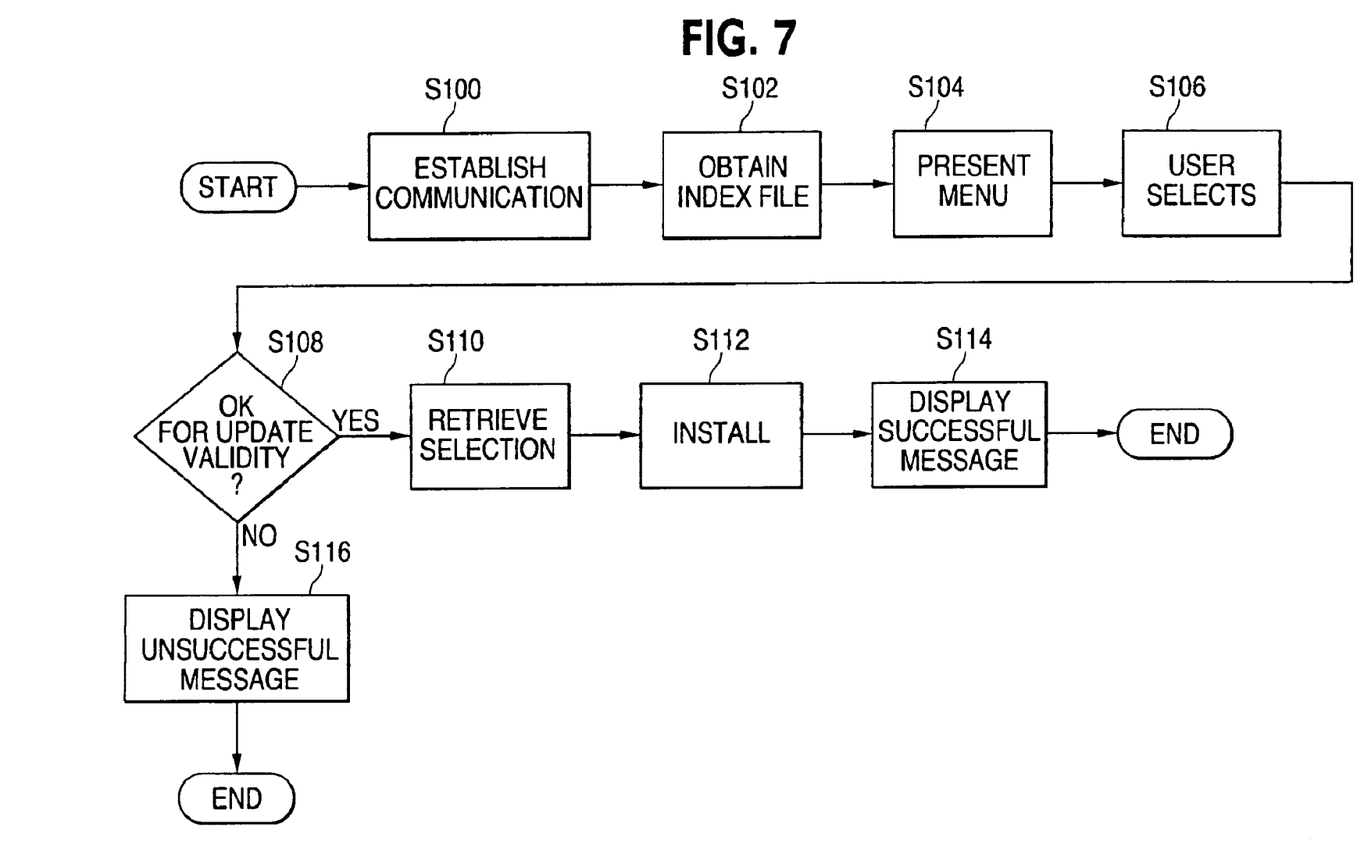
FIG. 7 shows a flow chart of an exemplary process for updating diagnostics routines employing, for example, the Internet/smart card/modem.

As shown in the flowcharts of FIG. 7, a method of updating diagnostics routines employing, for example, the Internet/smart card/modem, is provided.

In a preferred embodiment, in using a bulletin board system via the Internet, a user, such as a repair technician, operates the diagnostic tool 10 to trigger a dial-up connection to the bulletin board (Step 100 or S100). Communications may be established through a point-point protocol (PPP) connection between the diagnostic tool and the server, using the tool's modem. Alternatively, communications may be established through a standard dial-up connection. Furthermore, communications may be established using an Ethernet communication to a local network, or the like.

Once a connection is established, the tool's internal software obtains an index file, which contains a list of available downloadable diagnostic applications, and begins analyzing the existing diagnostic applications in the tool 10 (S102). A menu list of available applications is displayed to the user (S104), who initiates a desired upgrade or modification selection (S106).

At this juncture (S108), software internal to the diagnostic tool 10 performs a verification check for update validity; that is, the verification check process is to determine whether the tool has the ability to download the requested diagnostic application upgrade, for example. In a preferred embodiment, one verification criteria is the existence of a valid smart card. Alternatively and optionally, another verification criteria is the existence of a valid application record stored on the internal hard drive of the tool 10. Upon successful verification, the requested diagnostic application(s) is/are retrieved (S110), and the application upgrade/modification is automatically downloaded or installed on the tool (S112). The tool then notifies the user that the upgrade or modification process is complete (S114). On the other hand, if verification is unsuccessful (S116), the user is notified with an appropriate display message on the tool 10.

The above description and drawings are only illustrative of preferred embodiments which achieve the objects, features, and advantages of the present invention, and it is not intended that the present invention be limited thereto. Any modification of the present invention which comes within the spirit and scope of the following claims is considered to be part of the present invention.

What is claimed is:

1. A diagnostic tool for communicating with a vehicular electronic control unit, said diagnostic comprising:
   a microprocessor for executing an operating system and one or more diagnostic application programs;
   a non-volatile storage device, in a form of at least one internal and external memory, coupled to said microprocessor; and
   a user interface having at least one integrally connected computer media port for receiving a portable media device, wherein the media port is configured to serve as a basis for updating of at least one of a diagnostic application program and memory of said tool, wherein said user interface includes a smart card for controlling authorized access of diagnostics application programs, wherein said microprocessor, non-volatile storage device, and user interface are integrally connected to said diagnostic tool.

2. The diagnostic tool of claim 1, wherein said user interface of said tool is equipped with external ports usable for connecting communication and peripheral devices.

3. The diagnostic tool of claim 1, wherein said user interface includes a flash card port for supplying at least one of new application programs and upgrades to be loaded into said non-volatile storage device of said tool.

4. The diagnostic tool according to claim 3, wherein said tool memory and one or more resident diagnostic application programs are updated using a flash card.

5. The diagnostic tool according to claim 4, wherein said tool is capable of establishing a point to point link to the Internet.

6. The diagnostic tool according to claim 5, wherein at least one of diagnostic program upgrades and modifications to said tool is performed using a bulletin board system through a point-to-point protocol connection.

7. The diagnostic tool of claim 1, wherein said user interface includes a PCMCIA card port for supplying modem, Ethernet and wireless communications.

8. The diagnostic tool of claim 1, wherein said user interface includes one or more serial communication port usable to communicate with a personal computer.

9. The diagnostic tool of claim 1, wherein said user interface includes an infrared communication area used for infrared communication with a desired peripheral device.

10. The diagnostic tool of claim 1, wherein said user interface includes a universal serial bus port for communicating with at least one of a keyboard, printer and memory hard drive.

11. The diagnostic tool of claim 1, wherein said user interface includes a hardware interface module port for enabling implementation of cartridge-contained software application programs.

12. The diagnostic tool of claim 11, wherein said user interface includes a hardware interface module port for enabling implementation of emission upgrades.

13. The diagnostic tool of claim 11, wherein said user interface includes a hardware interface module port for enabling implementation of lab scope upgrades.

14. The diagnostic tool of claim 11, wherein said user interface includes a hardware interface module port for enabling implementation of ignition upgrades.

15. The diagnostic tool of claim 11, wherein said user interface includes a hardware interface module port for enabling implementation of re-flash upgrades.

16. The diagnostic tool of claim 11, wherein said user interface includes a hardware interface module port for enabling implementation of multi-meter upgrades.

17. The diagnostic tool of claim 1, wherein said user interface includes an external power port for recharging an internal battery.

18. The diagnostic tool of claim 1, wherein said user interface includes a 25-pin port used to connect a cable to a vehicle data link connector.

19. A method of remotely updating diagnostic application programs residing in at least one of internal and external memory of a portable diagnostic tool, said method comprising the steps of:
   providing a diagnostic tool for communicating with a vehicular electronic control unit, the diagnostic tool having a user interface having at least one integrally connected computer media port for receiving a portable media device wherein the media port is configured to serve as a basis for updating of at least one of a diagnostic application program and memory of the diagnostic tool;
   displaying upgrade procedures after electronic access by a user;
   determining whether said diagnostic tool is valid for an update;
   determining whether a valid smart card is present; and
   providing user notification of the requested upgrade.

20. A diagnostic tool for communicating with a vehicular electronic control unit, said diagnostic tool comprising:
   means for executing an operating system and one or more diagnostic application programs;
   means for storing diagnostic application programs, said storing means comprising at least one internal and external memory coupled to said means for executing; and
   means for interfacing with the diagnostic tool having at least one integrally connected computer media port for receiving a portable media device, wherein the media port is configured to serve as a basis for updating at least one of a diagnostic application program and a memory of said tool, wherein said executing means, storing means, and interfacing means are integrally connected to said diagnostic tool; and
   means for determining whether a valid smart card is present.

21. The diagnostic tool of claim 20, further comprising: means for displaying upgrade procedures after electronic access by a user.

22. The diagnostic tool of claim 20, further comprising: means for determining whether said diagnostic tool is valid for an update.

23. The diagnostic tool of claim 20, further comprising: means for providing user notification of the requested upgrade.

* * * * *